United States Patent
Kojima et al.

(10) Patent No.: US 7,923,861 B2
(45) Date of Patent: Apr. 12, 2011

(54) METHOD OF CONTROLLING HYBRID DC POWER SUPPLY SYSTEM

(75) Inventors: Yasushi Kojima, Utsunomiya (JP);
Seigo Murashige, Utsunomiya (JP);
Yutaka Asano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 12/338,451

(22) Filed: Dec. 18, 2008

(65) Prior Publication Data
US 2009/0160252 A1    Jun. 25, 2009

(30) Foreign Application Priority Data

Dec. 21, 2007   (JP) ................... 2007-330923

(51) Int. Cl.
*H02J 1/10* (2006.01)
(52) U.S. Cl. .......................... 307/53; 307/43
(58) Field of Classification Search ............ 307/43, 307/52
See application file for complete search history.

(56) References Cited

U.S. PATENT DOCUMENTS

| | | | |
|---|---|---|---|
| 6,321,145 B1 * | 11/2001 | Rajashekara | 701/22 |
| 6,369,461 B1 * | 4/2002 | Jungreis et al. | 307/46 |
| 6,428,917 B1 * | 8/2002 | Lacy et al. | 429/13 |
| 6,447,939 B1 * | 9/2002 | Iwasaki | 429/9 |
| 6,628,011 B2 * | 9/2003 | Droppo et al. | 307/43 |
| 6,792,341 B2 * | 9/2004 | Hunt et al. | 701/22 |
| 6,795,756 B1 * | 9/2004 | Zhang et al. | 701/22 |
| 6,920,948 B2 * | 7/2005 | Sugiura et al. | 180/65.28 |
| 6,953,100 B2 * | 10/2005 | Aberle et al. | 429/432 |
| 6,975,091 B2 * | 12/2005 | Lee et al. | 320/104 |
| 7,202,634 B2 * | 4/2007 | Bucur | 320/137 |
| 7,371,476 B2 * | 5/2008 | Aso | 429/429 |
| 7,438,984 B2 * | 10/2008 | Aoyagi et al. | 429/12 |
| 7,521,898 B2 * | 4/2009 | Kobayashi | 320/162 |
| 7,527,112 B2 * | 5/2009 | Aoyagi et al. | 180/65.265 |
| 2002/0038732 A1 | 4/2002 | Sugiura et al. | |
| 2009/0212634 A1 * | 8/2009 | Kojima et al. | 307/77 |
| 2009/0230917 A1 * | 9/2009 | Kojima et al. | 320/101 |

FOREIGN PATENT DOCUMENTS

| | | |
|---|---|---|
| JP | 7-123609 | 5/1995 |
| JP | 9-74666 | 3/1997 |
| JP | 9-284902 | 10/1997 |
| JP | 2002-118981 | 4/2002 |
| JP | 2004-166376 | 6/2004 |

OTHER PUBLICATIONS

Japanese Office Action for Application No. 2007-330923, dated Oct. 27, 2009.
Japanese Office Action for Application No. 2007-330923, dated Oct. 5, 2010.

* cited by examiner

*Primary Examiner* — Jared J Fureman
*Assistant Examiner* — Adi Amrany
(74) *Attorney, Agent, or Firm* — Nelson Mullins Riley & Scarborough LLP; Anthony A. Laurentano

(57) ABSTRACT

A fuel cell vehicle has a motor driven by an inverter and hybrid DC power supplies including a battery and a fuel cell for supplying electric power to the motor. For preventing a fuse connected to the battery from being blown out, when a motor current Im increases, a first source current flowing from the battery is limited to a range for not blowing out the fuse, and a generated current is increased as much as the first source current is limited.

12 Claims, 12 Drawing Sheets

METHOD OF CONTROLLING HYBRID DC POWER SUPPLY SYSTEM

BACKGROUND OF THE INVENTION

1. Field of the Invention

The present invention relates to a method of controlling a hybrid DC power supply system for supplying electric power from first and second DC power supply devices to a load, and more particularly to a method of controlling a hybrid DC power supply system for use in a fuel cell vehicle wherein a battery and a fuel cell supply electric power to an inverter-driven motor.

2. Description of the Related Art

Heretofore, there has been proposed an electric vehicle wherein a vehicle travel motor (electric motor) is energized by a battery (Japanese Laid-Open Patent Publication No. 09-284902).

In this electric vehicle, a fuse is connected to an output terminal of the battery. When an overcurrent flows from the battery, the fuse is immediately blown out to prevent the overcurrent from further flowing from the battery, thereby protecting the battery.

If the fuse is blown out, then the battery is unable to supply electric power until the fuse is replaced with a new one. As a result, the electric vehicle cannot be put to use in the meantime.

SUMMARY OF THE INVENTION

It is an object of the present invention to provide a method of controlling a hybrid DC power supply system to protect a first DC power supply device, e.g., a battery, while preventing, as much as possible, a fuse connected to the first DC power supply device from blowing out due to an overcurrent.

According to an aspect of the present invention, there is provided a method of controlling a hybrid DC power supply system including a first DC power supply device for generating a first output voltage and delivering a first source current or receiving a first sink current, a second DC power supply device connected to a load, for delivering a second source current which increases as a second output voltage generated thereby decreases and which decreases as the second output voltage increases, and a voltage increasing/reducing DC/DC converter connected between the first DC power supply device and a junction between the load and the second DC power supply device, for controlling the second output voltage by increasing or reducing duty ratios for driving switching devices thereof, the method comprising the steps of, controlling the hybrid DC power supply system such that a load sink current demanded by the load is the sum of a current converted from the first source current by the DC/DC converter and the second source current; and controlling the second output voltage of the second DC power supply device such that a value of a current flowing from an output point of the first DC power supply device through the DC/DC converter to the junction does not exceed a predetermined threshold value.

According to the present invention, a characteristic and simple control configuration is employed for controlling the second output voltage of the second DC power supply device such that the value of the current flowing from the output point of the first DC power supply device through the DC/DC converter to the junction of the second DC power supply device does not exceed a predetermined threshold value, thereby preventing a fuse connected to the output point of the first DC power supply device from being blown out due to an overcurrent.

By controlling the output voltage of the second DC power supply device such that the value of the current flowing from the output point of the first DC power supply device through the DC/DC converter to the junction of the second DC power supply device does not exceed a predetermined threshold value, an overcurrent is prevented from flowing as the first source current from the first DC power supply device. Threshold values for the currents flowing through the respective current paths, which correspond to an overcurrent threshold value for the first source current, may be determined and stored in a memory, and may be compared with measured currents.

When the output point of the first DC power supply device is short-circuited, the fuse is blown out.

According to the present invention, the fuse connected to the output point of the first DC power supply device is prevented from being blown out due to an overcurrent by a characteristic and simple control configuration for controlling the second output voltage of the second DC power supply device such that the value of the current flowing from the output point of the first DC power supply device through the DC/DC converter to the junction of the second DC power supply device does not exceed a predetermined threshold value.

According to another aspect of the present invention, there is also provided a method of controlling a hybrid DC power supply system including a first DC power supply device, a second DC power supply device connected to a load, and a chopper DC/DC converter connected between the first DC power supply device and a junction between the load and the second DC power supply device, the method comprising the steps of increasing or reducing duty ratios for driving switching devices of the DC/DC converter depending on a value of a current flowing from an output point of the first DC power supply device through the DC/DC converter to the junction, increasing or reducing a second output voltage of the second DC power supply device when the duty ratios are increased or reduced, increasing a second source current flowing from the second DC power supply device when the second output voltage of the second DC power supply device is reduced, and reducing the second source current flowing from the second DC power supply device when the second output voltage of the second DC power supply device is increased, and increasing or reducing the second source current such that the value of the current flowing from the output point of the first DC power supply device through the DC/DC converter to the junction does not exceed a predetermined threshold value.

According to the present invention, since the second source current flowing from the second DC power supply device is increased or reduced such that the value of the current flowing from the output point of the first DC power supply device through the DC/DC converter to the junction of the second DC power supply device does not exceed a predetermined threshold value, a fuse connected to the current path from the output point of the first DC power supply device (e.g., a battery), for example, is prevented from being blown out due to an overcurrent of the threshold value or more. When the output point of the first DC power supply device is short-circuited, the fuse is blown out.

If the value of the current flowing through the current path is smaller than the threshold value, then an output (e.g., a current, a voltage, or a power) of the second DC power supply device is controlled by increasing or reducing the duty ratios in an ordinary operation mode (e.g., a first mode). If the value of the current flowing through the current path is equal to or greater than the threshold value, then the ordinary operation mode is interrupted, and currents input to and output from the first DC power supply device are controlled so as not to exceed a predetermined threshold value in a monitoring operation mode (e.g., a second mode or a third mode).

The principles of the present invention are applicable to a fuel cell vehicle, for example, which incorporates the hybrid DC power supply system wherein the load represents a motor driven by an inverter.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A method of controlling a hybrid DC power supply system according to the present invention will be described below with reference to the drawings.

Figure 1:
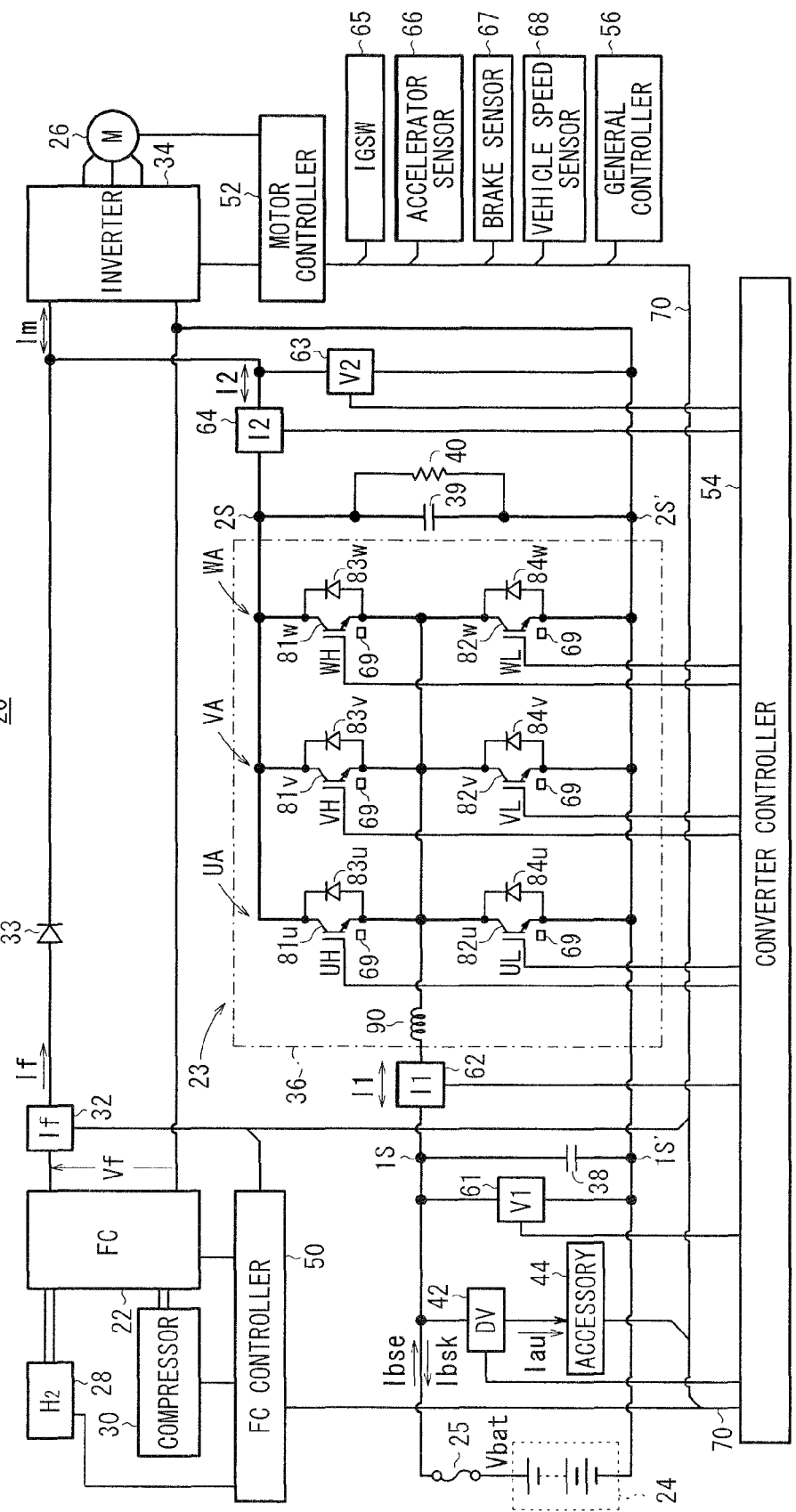
FIG. 1 is a circuit diagram, partly in block form, a fuel cell vehicle according to an embodiment of the present invention.

FIG. 1 shows a fuel cell vehicle 20 according to an embodiment of the present invention. As shown in FIG. 1, the fuel cell vehicle 20 basically comprises a hybrid power supply system (hybrid DC power supply system) including a fuel cell (FC) 22 as a second DC power supply device and an electricity storage device (referred to as "battery") 24 which is an energy storage as a first DC power supply device, a travel motor 26 as a load for being supplied with a current (electric power) from the hybrid DC power supply system through an inverter 34, and a DC/DC converter apparatus {also referred to as "VCU (Voltage Control Unit)"} 23 for converting voltages between primary terminals 1S, 1S' connected to the battery 24 and secondary terminals 2S, 2S' connected to the fuel cell 22 and the motor 26 (the inverter 34).

The VCU 23 comprises a DC/DC converter 36 and a converter controller 54 serving as a controller for controlling the switching elements of the DC/DC converter 36.

The fuel cell 22 is of a stacked structure made up of cells each comprising an anode, a cathode, and a solid polymer electrolyte membrane sandwiched between the anode and the cathode. The fuel cell 22 is connected to a hydrogen tank 28 and an air compressor 30 by pipes. The fuel cell 22 generates a current If as a second source current due to an electrochemical reaction between reaction gases of hydrogen (fuel gas) and air (oxidizing gas). The generated current If is supplied through a current sensor 32 and a diode (also referred to as "disconnecting diode") 33 to the inverter 34 and/or the DC/DC converter 36. The fuel cell 22 also generates a voltage Vf as a second output voltage.

The inverter 34 converts the direct current If into an alternating motor current Im that is supplied to the motor 26 which is operating in a propulsive power mode. The inverter 34 also converts an alternating motor current that is generated by the motor 26 in a regenerative mode into a direct motor current Im, which is supplied from the secondary terminal 2S to the primary terminal 1S through the DC/DC converter 36.

A secondary voltage V2, which may be the regenerated voltage in the regenerative mode or the generated voltage Vf across the fuel cell 22, is converted into a low primary voltage V1 by the DC/DC converter 36. The low primary voltage V1 is further converted into a lower voltage by a downverter 42. The downverter 42 supplies, under the lower voltage, an accessory current Iau to accessories 44 such as lamps, etc. and also supplies any excess current as a first sink current Ibsk to charge the battery 24 under the primary voltage V1.

The battery 24, which is connected to the primary terminals 1S, 1S', may comprise a lithium ion secondary battery or a capacitor. In the present embodiment, the battery 24 comprises a lithium ion secondary battery.

The battery 24 delivers a first source current Ibse to supply the accessory current Iau to the accessories 44 through the downverter 42, and also to supply the motor current Im through the DC/DC converter 36 to the inverter 34.

A fuse 25 for protecting the battery 24 from short circuit is connected in series to an output terminal of the battery 24.

Smoothing capacitors 38, 39 are connected respectively between the primary terminals 1S, 1S' and between the secondary terminals 2S, 2S'. A resistor 40 is connected across the smoothing capacitor 39, i.e., across the fuel cell 22.

A system including the fuel cell 22, the hydrogen tank 28, and the air compressor 30 is controlled by an FC controller 50. A system including the inverter 34 and the motor 26 is controlled by a motor controller 52 which includes an inverter driver. A system including the DC/DC converter 36 is controlled by the converter controller 54 which includes a converter driver.

The FC controller 50, the motor controller 52, and the converter controller 54 are controlled by a general controller 56 which serves as a higher-level controller for determining a total demand load Lt on the fuel cell 22, etc.

Each of the general controller 56, the FC controller 50, the motor controller 52, and the converter controller 54 comprises a CPU, a ROM, a RAM, a timer, input and output interfaces including an A/D converter, a D/A converter, and, if necessary, a DSP (Digital Signal Processor), etc.

The general controller 56, the FC controller 50, the motor controller 52, and the converter controller 54 are connected to each other by communication lines 70 of a CAN (Controller Area Network) as an intravehicular LAN or the like, and perform various functions by sharing input and output information from various switches and various sensors and executing programs stored in the ROMs under the CPUs based on the input and output information from the various switches and various sensors.

The switches and the sensors for detecting vehicle states include, in addition to the current sensor 32 for detecting the generated current If, a voltage sensor 61 for detecting a primary voltage V1 which is equal to a battery voltage Vbat as a first output voltage across the battery 24, a current sensor 62 for detecting a primary current I1, a voltage sensor 63 for detecting a secondary voltage V2 which is equal to the generated voltage Vf across the fuel cell 22 when the disconnecting diode 33 is rendered conductive, a current sensor 64 for detecting a secondary current I2, an ignition switch (IGSW) 65, an accelerator sensor 66, a brake sensor 67, a vehicle speed sensor 68 which are connected to the communication lines 70, and temperature sensors 69 connected to the converter controller 54.

The general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands), determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, through an arbitration process, based on the total demand load Lt, and sends commands indicative of the determined shares to the FC controller 50, the motor controller 52, and the converter controller 54.

The DC/DC converter 36 comprises three phase arms connected parallel to each other between a first power device in the form of the battery 24 and a second power device in the form of the fuel cell 22 or the regenerative power supply (the inverter 34 and the motor 26). The three phase arms include a U-phase arm UA (81u, 82u), a V-phase arm VA (81v, 82v), and a W-phase arm WA (81w, 82w) which are made up of upper arm switching devices 81 (81u, 81v, 81w) and lower arm switching devices 82 (82u, 82v, 82w) such as MOSFETs, IGBTs or the like.

Diodes 83u, 83v, 83w, 84u, 84v, 84w are connected inversely across the respective arm switching devices 81u, 81v, 81w, 82u, 82v, 82w.

A single reactor 90 for discharging and storing energy at the time the DC/DC converter 36 converts between the primary voltage V1 and the secondary voltage V2 is inserted between the battery 24 and the commonly connected midpoints of the U-phase arm UA, the V-phase arm VA, and the W-phase arm WA.

The upper arm switching devices 81 (81u, 81v, 81w) are turned on by gate drive signals (drive voltages) UH, VH, WH output from the converter controller 54 when the gate drive signals UH, VH, WH are high in level. The lower arm switching devices 82 (82u, 82v, 82w) are turned on by gate drive signals (drive voltages) UL, VL, WL output from the converter controller 54 when the gate drive signals UL, VL, WL are high in level.

Figure 2:
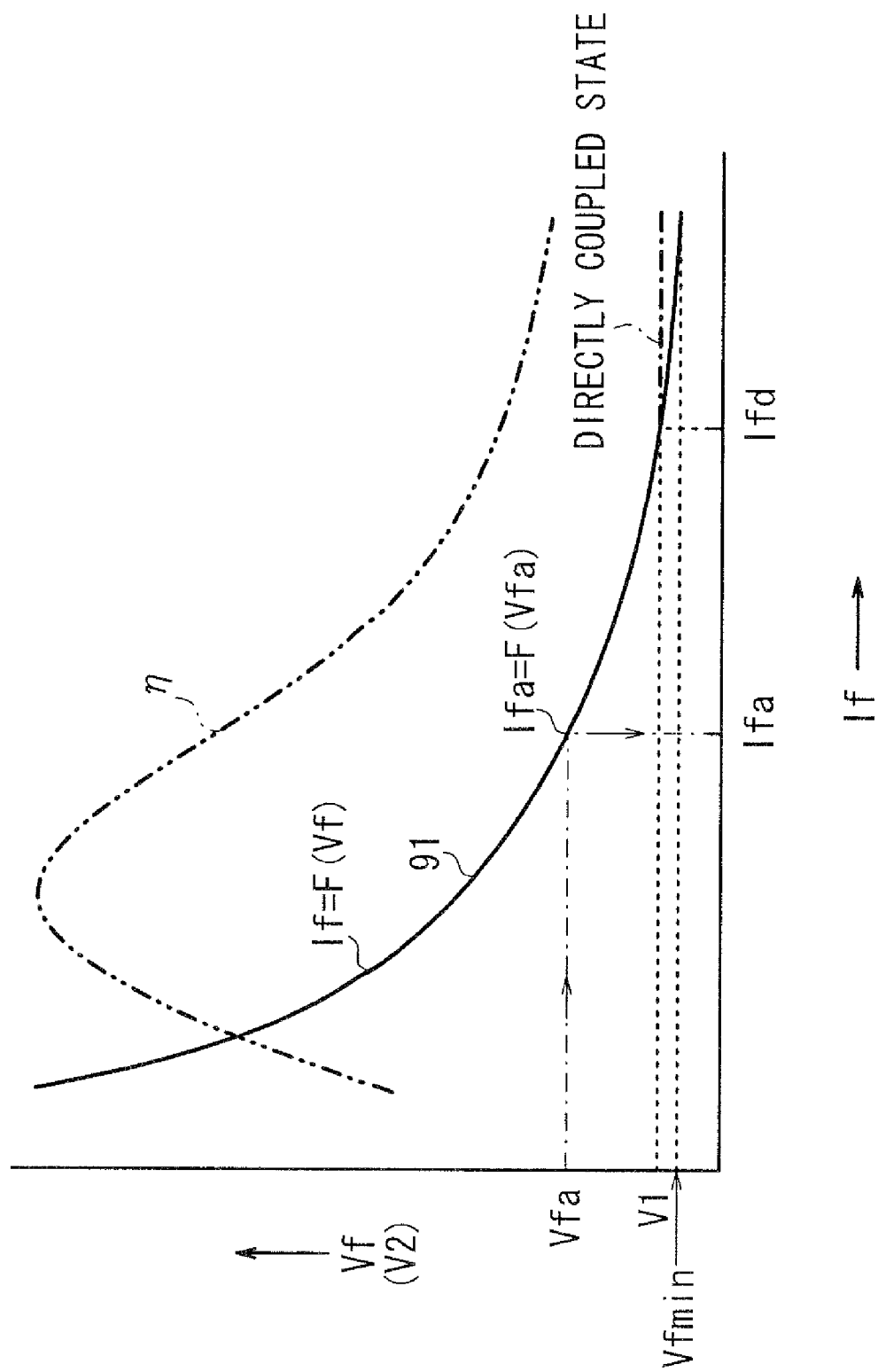
FIG. 2 is a diagram showing the current vs. voltage characteristics of a fuel cell.

The primary voltage V1, typically the open circuit voltage OCV across the battery 24 at the time no load is connected to the battery 24, is set to a voltage higher than a minimum voltage Vfmin of the generated voltage Vf of the fuel cell 22 as indicated by a fuel cell output characteristic curve (current vs. voltage characteristic curve) 91 shown in FIG. 2. In FIG. 2, OCV≈V1.

The secondary voltage V2 is equal to the generated voltage Vf of the fuel cell 22 while the fuel cell 22 is generating electric power.

When the generated voltage Vf of the fuel cell 22 becomes equal to the voltage Vbat (=V1) of the battery 24, the fuel cell 22 and the battery 24 are in a directly coupled state as indicated by the thick dot-and-dash line in FIG. 2. In the directly coupled state, the duty ratios of the gate drive signals UH, VH, WH supplied to the upper arm switching devices 81 (81u, 81v, 81w) are 100%, and the duty ratios of the gate drive signals UL, VL, WL supplied to the lower arm switching devices 82 (82u, 82v, 82w) are 0%. In the directly coupled state, when a current is to flow from the secondary terminal 2S to the primary terminal 1S in a charging direction (regenerating direction), the current flows through the upper arm switching devices 81 (81u, 81v, 81w). When a current is to flow from the primary terminal 1S to the secondary terminal 2S in a propulsive direction, the current flows through the diodes 83u, 83v, 83w.

The output control performed on the fuel cell 22 by the VCU 23 will be described below.

Figure 3:
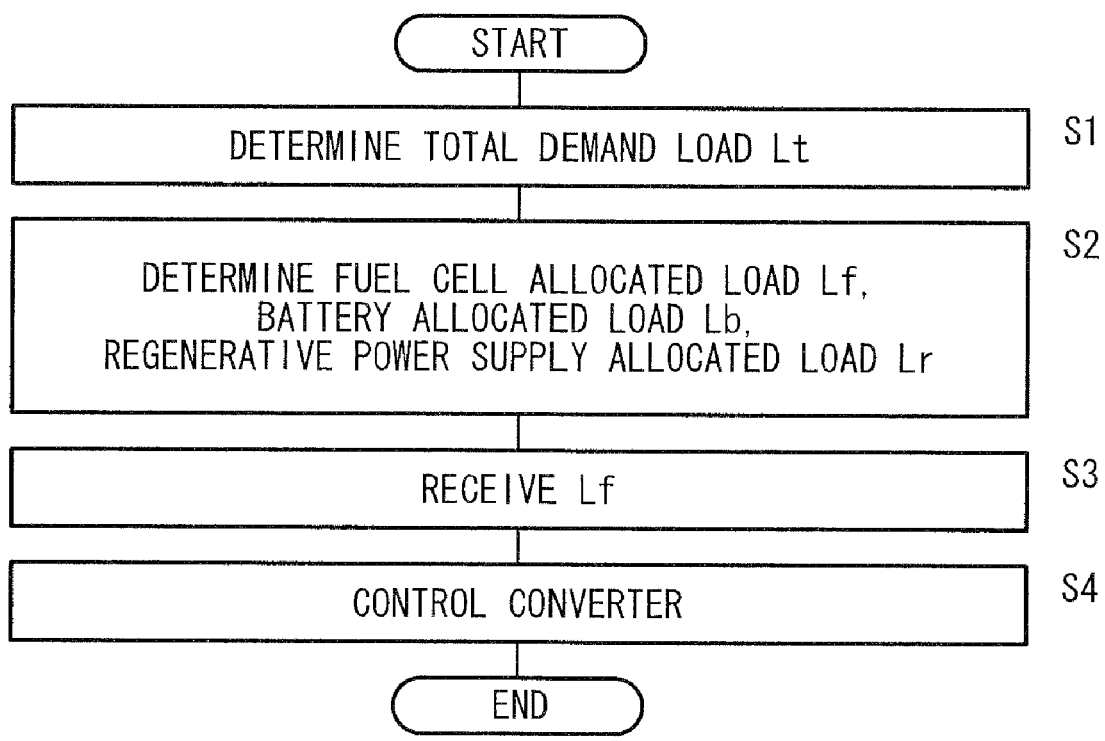
FIG. 3 is a flowchart of a basic control sequence of a DC/DC converter controlled by a converter controller.

When the fuel cell 22 generates electric power while it is being supplied with the fuel gas from the hydrogen tank 28 and the compressed air from the air compressor 30, the generated current If of the fuel cell 22 is determined by the converter controller 54 setting the secondary voltage V2, i.e., the generated voltage Vf, through the DC/DC converter 36 on the characteristic curve 91, also referred to as "function F(Vf)", shown in FIG. 3. The generated current If is determined as a function F(Vf) value of the generated voltage Vf. Since If=F(Vf), if the generated voltage Vf is set as Vf=Vfa=V2, a generated current Ifa is determined as a function value of the generated voltage Vfa (or V2) according to Ifa=F(Vfa)=F(V2).

Specifically, when the generated voltage Vf as the second output voltage of the fuel cell 22 is reduced, the generated current If as the second source current flowing from the fuel cell 22 increases, and when the generated voltage Vf increases, the generated current If flowing from the fuel cell 22 is reduced.

Inasmuch as the generated current If of the fuel cell 22 is determined when the secondary voltage V2 (the generated voltage Vf) is determined, the secondary voltage V2 (the generated voltage Vf) between the secondary terminals 2S, 2S' of the DC/DC converter 36 is set as a target voltage (target value) for the feedback control process performed by the VCU 23 including the converter controller 54 in the system including the fuel cell 22, such as the fuel cell vehicle 20. In other words, the output (generated current If) of the fuel cell 22 is controlled by the VCU 23. The output control performed on the fuel cell 22 by the VCU 23 has been described above.

In special cases when the battery 24 (the first power device) is regarded as suffering a failure such as when the battery 24 is opened due to a wire disconnection between the downverter 42 and the battery 24, the primary voltage V1 is used as the target voltage for the feedback control process performed by the VCU 23. When the first source current Ibse flowing from the battery 24 in the directly coupled state is of a value exceeding a threshold value (current limit value) Ithse, or when the first sink current Ibsk flowing into the battery 24 is of a value exceeding a threshold value (current limit value) Ithsk, the control process using the secondary voltage V2 as the target voltage changes to a control process (current upper limit limiting control process) using the primary current I1 as the target current in order to prevent the battery 24 from being deteriorated, to prevent the fuse 25 from blowing out, and to prevent the reactor 90 from being saturated. If the converter controller 54 detects when the battery 24 is short-circuited based on the voltage detected by the voltage sensor 61, then since the control process using the primary current I1 as the target current is not performed, the fuse 25 is blown out to protect the battery 24.

According to the current upper limit limiting control process for the first source current Ibse or the first sink current Ibsk, the converter controller 54 performs a feedback control process based on the proportional plus integral (PI) operation which uses values (I1=Ibse−Iau, I1=Ibsk+Iau) corresponding to the threshold values Ithse, Ithsk as target currents. If a current sensor is connected in series with the fuse 25, then the converter controller 54 may perform a feedback control process based on the PI operation using the value of the first source current Ibse as the target current threshold value Ithse, and a feedback control process based on the PI operation using the value of the first sink current Ibsk as the target current threshold value Ithsk.

Specifically, the feedback control process based on the PI operation is performed such that the value of a current flowing from the output point of the battery 24 through the DC/DC converter 36 to the secondary terminals 2S, 2S' through which the load (the motor 26 driven by the inverter 34) and the fuel cell 22 are connected will not exceed the target current threshold value Ithse for the first source current Ibse or the target current threshold value Ithsk for the first sink current Ibsk.

If the relationship between the target current threshold value Ithse for the first source current Ibse or the target current threshold value Ithsk for the first sink current Ibsk and the current flowing through each of the current paths is measured and stored in a memory, not shown, such as an EEPROM or the like in the converter controller 54, then an alternative control process may be carried out wherein the current flowing through each of the current paths is used as a controllable quantity that is not to exceed the target current threshold value Ithse for the first source current Ibse or the target current threshold value Ithsk for the first sink current Ibsk.

The PI operation is employed for the purpose of bringing the first source current Ibse into conformity with the target current threshold value Ithse or bringing the first sink current Ibsk into conformity with the target current threshold value Ithsk without a deviation (offset). The PID (Proportional plus Integral plus Derivative) operation may be used instead of the PI operation.

The feedback control process may be carried out based on only the proportional (P) operation. However, the feedback control process based on only the P operation is problematic in that since it causes an error to increase by an offset, the battery 24 is possibly deteriorated by an overcurrent due to the increasing error, and, as will be described later, the cancellation of the current upper limit limiting control process tends to be delayed.

According to the present embodiment, inasmuch as the generated voltage Vf of the fuel cell 22 is set to a value higher than the open circuit voltage OCV of the battery 24, the DC/DC converter 36 has a lower voltage at the primary terminals 1S, 1S' and a higher voltage at the secondary terminals 2S, 2S'. However, if the hybrid DC power supply system is designed such that the generated voltage Vf of the fuel cell 22 is set to a value lower than the open circuit voltage OCV of the battery 24, then the primary terminals 1S, 1S' and the secondary terminals 2S, 2S' of the DC/DC converter 36 are switched around.

A basic operation of the DC/DC converter 36 that is controlled by the converter controller 54 will be described below with reference to FIG. 3.

As described above, the general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands). Then, the general controller 56 determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, through an arbitration process, based on the total demand load Lt, and sends commands indicative of the determined shares to the FC controller 50, the motor controller 52, and the converter controller 54.

In step S1 shown in FIG. 3, the general controller 56 determines (calculates) a total demand load Lt from the power demand of the motor 26, the power demand of the accessories 44, and the power demand of the air compressor 30, which all represent load demands. In step S2, the general controller 56 determines the shares of a fuel cell allocated load Lf, a battery allocated load Lb, and a regenerative power supply allocated load Lr for outputting the determined total demand load Lt, and sends commands indicative of the determined shares to the FC controller 50, the motor controller 52, and the converter controller 54. When the general controller 56 determines the fuel cell allocated load Lf, the general controller 56 takes the efficiency η of the fuel cell 22 into account.

Then, in step S3, the fuel cell allocated load (essentially including a command voltage V2com for the generated voltage Vf to be directed to the converter controller 54) Lf determined by the general controller 56 is transmitted as a command through the communication lines 70 to the converter controller 54. In response to the command of the fuel cell allocated load Lf, the converter controller 54 controls the duty ratios for driving the arm switching devices 81u, 81v, 81w, 82u, 82v, 82w of the DC/DC converter 36, i.e., the on-duty ratios of the gate drive signals UH, VH, WH, UL, VL, WL, to bring the secondary voltage V2, i.e., the generated voltage Vf of the fuel cell 22 into conformity with the command voltage V2com from the general controller 56. The secondary voltage V2 (or the primary voltage V1) is controlled by the converter controller 54 while it is controlling the DC/DC converter 36 in the PID operation based on a combination of a feed-forward control process and a feedback control process.

In response to commands from the general controller 56, the FC controller 50 and the motor controller 52 also perform their processing sequences.

The FC controller 50, the converter controller 54, and the motor controller 52 report the results of their control processes to the general controller 56 from time to time.

In view of the fact that the fuel cell vehicle 20 may smoothly respond to user's actions such as an action on the accelerator pedal without causing the user to feel strange and uncomfortable, the general controller 56 may have a processing period which is longer than the processing period of the converter controller 54 whose switching period is about 50 μS. For example, the processing period of the general controller 56 is set to a value in the range from 1 to 1000 mS. The processing period of the converter controller 54 is set to a value in the range from 1 to 1000 μS.

The converter controller 54 energizes the DC/DC converter 36 in a voltage increasing mode or a voltage reducing mode, as described below.

Figure 4:
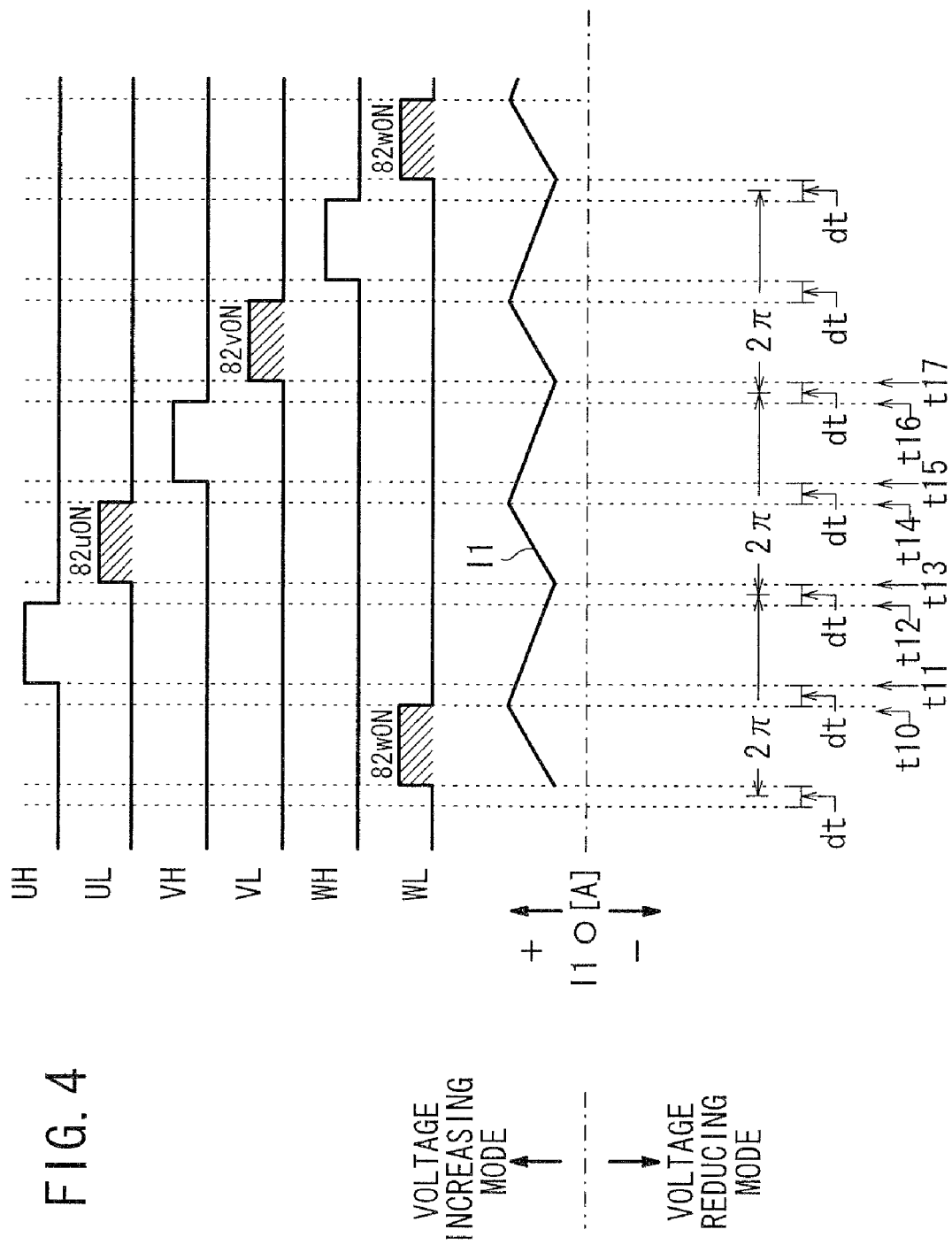
FIG. 4 is a timing chart of a voltage increasing mode of a DC/DC converter apparatus.

In the voltage increasing mode for sourcing the secondary current I2 from the secondary terminals 2S, 2S' of the DC/DC converter 36 to the inverter 34 in step S4, the converter controller 54 controls the DC/DC converter 36 in a rotation switching process by turning on the lower arm switching device 82u at time t13 in FIG. 4 to store energy in the reactor 90 with the primary current I1 produced by subtracting the accessory current Iau from the battery current Ibat and at the same time to source the secondary current I2 from the capacitor 39 to the inverter 34, then rendering the diodes 83u, 83v, 83w conductive at times t14 through t17 to discharge the energy from the reactor 90, to store the energy in the capacitor 38, and to source the secondary current I2 to the inverter 34, thereafter turning on the lower arm switching device 82v at t17, then rendering the diodes 83u, 83v, 83w conductive, then turning on the lower arm switching device 82w, then rendering the diodes 83u, 83v, 83w conductive, thereafter turning on the lower arm switching device 82u, and so on.

The upper arm switching devices 81u, 81v, 81w and the lower arm switching devices 82u, 82v, 82w have their on-duty ratios determined to keep the secondary voltage V2 in conformity with the command voltage V2com.

In a directly coupled mode for sourcing the secondary current I2 from the secondary terminals 2S, 2S' of the DC/DC converter 36 to the inverter 34 in step S4, the diodes 83u, 83v, 83w are rendered conductive, and the secondary voltage V2 is represented by V2=V1−Vd where Vd represents a forward voltage drop across the diodes 83u, 83v, 83w.

Figure 5:
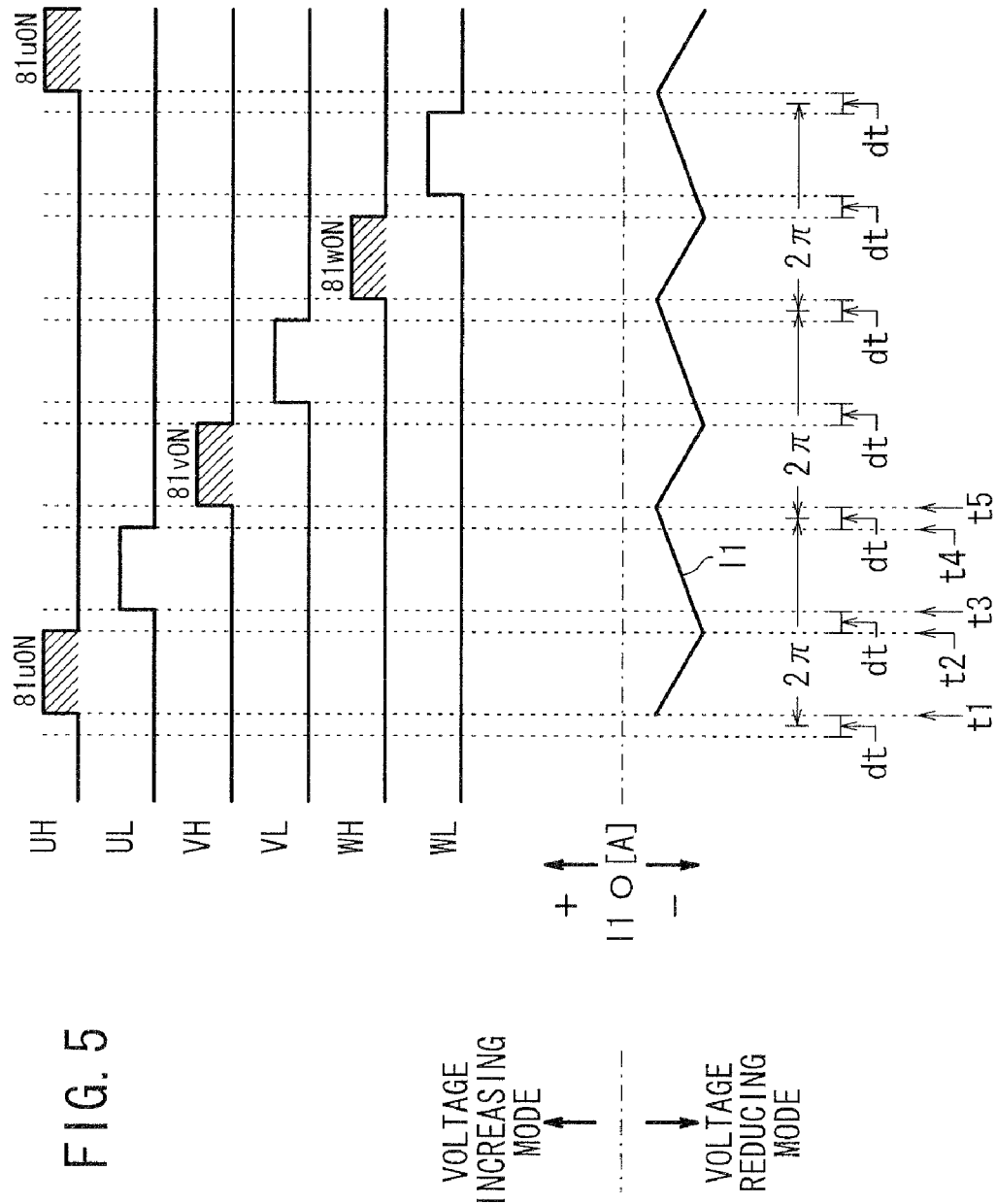
FIG. 5 is a timing chart of a voltage reducing mode of the DC/DC converter apparatus.

In the voltage reducing mode for supplying or sinking the secondary current I2 from the secondary terminals 2S, 2S' of the DC/DC converter 36 to the accessories 44 and the battery 24 at the primary terminals 1S, 1S' in step S4, the converter controller 54 controls the DC/DC converter 36 in a rotation switching process by turning on the upper arm switching device 81u at time t1 in FIG. 5 to store energy in the reactor 90 with the secondary current I2 output from the capacitor 39 and at the same time to supply the primary current I1 from the capacitor 38 to the accessories 44 and, if necessary, the battery 24, then rendering the diodes 84u, 84v, 84w conductive at times t2 through t5 to operate as flywheel diodes to discharge the energy from the reactor 90, to store the energy in the capacitor 39, and to supply the primary current I1 to the accessories 44 and, if necessary, the battery 24, thereafter turning on the upper arm switching device 81v at time t5, then rendering the diodes 84u, 84v, 84w conductive, then turning on the upper arm switching device 81w, then rendering the diodes 84u, 84v, 84w conductive, thereafter turning on the upper arm switching device 81u, and so on.

If a regenerated voltage exists, then a regenerated current due to the regenerative power supply allocated load Lr is added to the secondary current I2 that is sunk from the secondary terminal 2S of the DC/DC converter 36 in the voltage reducing mode. In the voltage reducing mode, the upper arm switching devices 81u, 81v, 81w and the lower arm switching devices 82u, 82v, 82w also have their on-duty ratios controlled to keep the secondary voltage V2 in conformity with the command voltage V2com.

In the present embodiment, the converter controller 54 determines, in each processing period (3×2π) which is three times a switching period 2π (corresponding to the time of the reciprocal (e.g., 1/10-odd kHz≈50 μS) of the switching frequency), an operation sequence of the DC/DC converter 36, i.e., a converter control sequence in step S4, to be performed in a next period of 3×2π.

In FIGS. 4 and 5, the primary current I1 flowing through the reactor 90 has a positive (+) sign when it flows from the primary terminal 1S to the secondary terminal 2S in the voltage increasing mode (a source current flowing from the secondary terminal 2S of the DC/DC converter 36 to the inverter 34), and a negative sign (−) when it flows from the secondary terminal 2S to the primary terminal 1S in the voltage reducing mode (a sink current flowing from the fuel cell 22 or the inverter 34 to the secondary terminal 2S of the DC/DC converter 36).

Of the waveforms of the gate drive signals UH, UL, VH, VL, WH, WL output from the converter controller 54, periods that are shown hatched represent periods in which the arm switching devices which are supplied with the gate drive signals UH, UL, VH, VL, WH, WL (e.g., the upper arm switching device 81u is supplied with the gate drive signal UH) are actually turned on, i.e., currents are flowing through the arm switching devices. It is to be noted that even when the arm switching devices are supplied with the gate drive signals UH, UL, VH, VL, WH, WL, currents do not flow through the arm switching devices unless the corresponding parallel diodes 83u, 83v, 83w, 84u, 84v, 84w are turned off.

Figure 6:
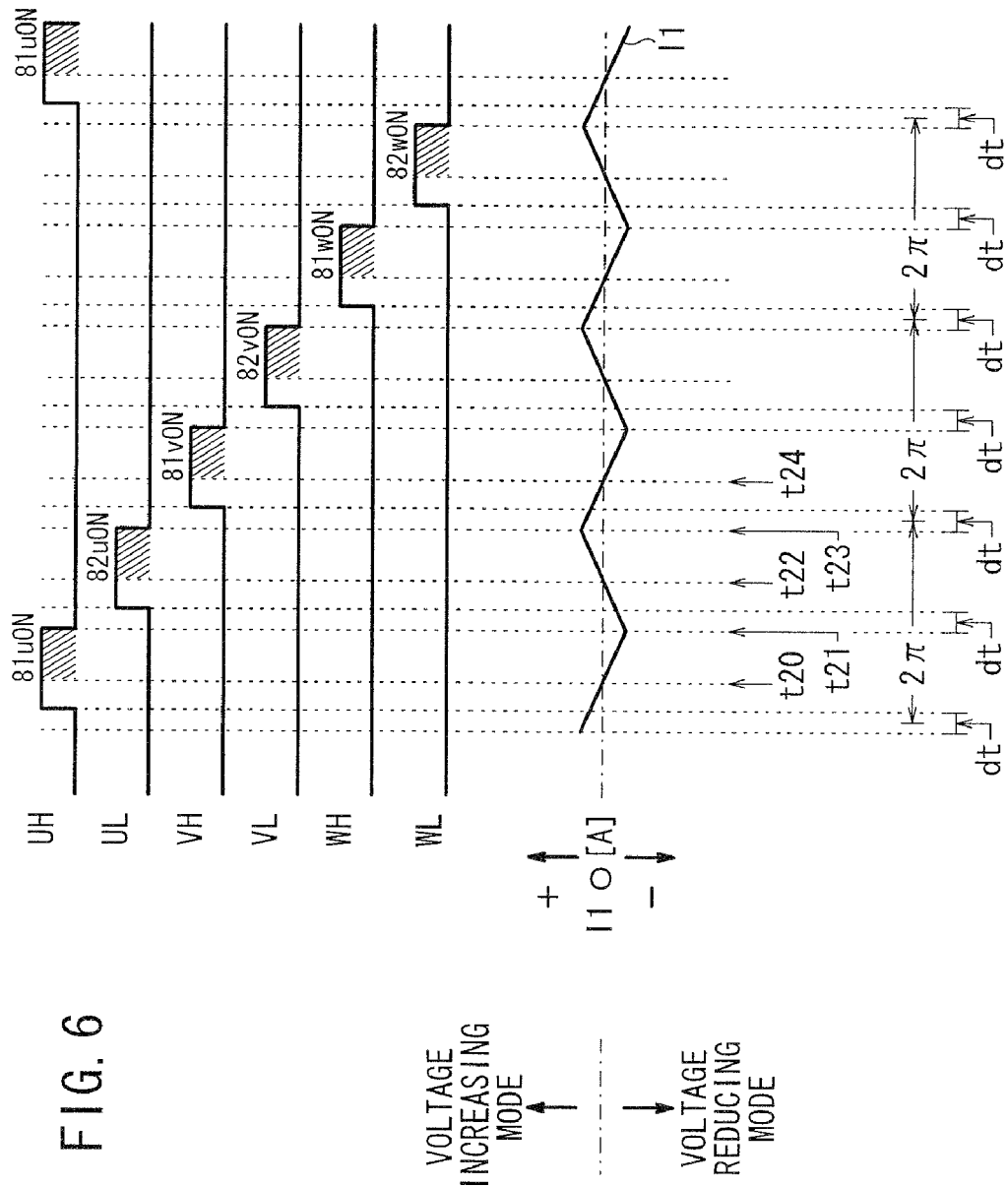
FIG. 6 is a timing chart showing transitions of the voltage increasing mode and the voltage reducing mode of the DC/DC converter apparatus.

As shown in FIGS. 4, 5, and 6, in order to prevent the upper and lower arm switching devices 81, 82 from being turned on simultaneously and hence to prevent the secondary voltage V2 from being short-circuited, dead times dt are inserted between the gate drive signals UH, UL, the gate drive signals VH, VL, and the gate drive signals WH, WL for alternately turning on the upper arm switching devices 81u, 81v, 81w or the lower arm switching devices 82u, 82v, 82w. When the U-, V-, W-phase arms UA, VA, WA are alternately turned on, dead times dt are inserted between the gate drive signals UL, VH, the gate drive signals VL, WH, and the gate drive signals WL, UH. In other words, so-called synchronous switching is performed with the dead times dt inserted between the ON times.

FIG. 6 shows transitions of the voltage increasing mode and the voltage reducing mode. In FIG. 6, in a period (shown hatched) between time t20 and time t21 during which the upper arm switching device 81u is turned on by the gate drive signal UH, energy is stored in the reactor 90 through the upper arm switching device 81u by the secondary current I2 from the fuel cell 22 and/or the regenerative power supply.

In a period from time t21 to time t22 when the direction of the current is inverted (the sign of the current changes from negative to positive), the energy stored in the reactor 90 is discharged to the primary terminal 1S through the diodes 84u, 84v, 84w that function as flywheel diodes and are rendered conductive.

In a period between time t22 and time t23 during which the lower arm switching device 82u is turned on by the gate drive signal UL, energy is stored in the reactor 90 by the primary current I1 from the battery 24. In a period from time t23 to time t24 when the direction of the current is inverted (the sign of the current changes from positive to negative), the energy stored in the reactor 90 is discharged to the secondary terminal 2S through the diodes 83u, 83v, 83w that function as flywheel diodes and are rendered conductive. The same operation as describe above will subsequently be repeated. In the three-phase rotation switching process according to the present embodiment, as described above, smooth switching is made between the voltage increasing mode and the voltage reducing mode.

The basic operation of the DC/DC converter 36 controlled by the converter controller 54 has been described above.

The fuel cell vehicle 20 according to the present embodiment is basically constructed and operated as described above. An operation mode A for preventing the fuse 25 from blowing out, i.e., an operation mode for limiting the source current Ibse flowing from the battery 24, and an operation mode B, i.e., an operation mode for limiting the first sink current Ibsk flowing into the battery 24, will be described below.

It is assumed for an easier understanding of the invention that in the operation modes A, B, the accessory current Iau is nil, and both the first source current Ibse and the first sink current Ibsk are equal to the primary current I1.

The operation mode A for limiting the source current Ibse flowing from the battery 24 will first be described below.

Figure 7:
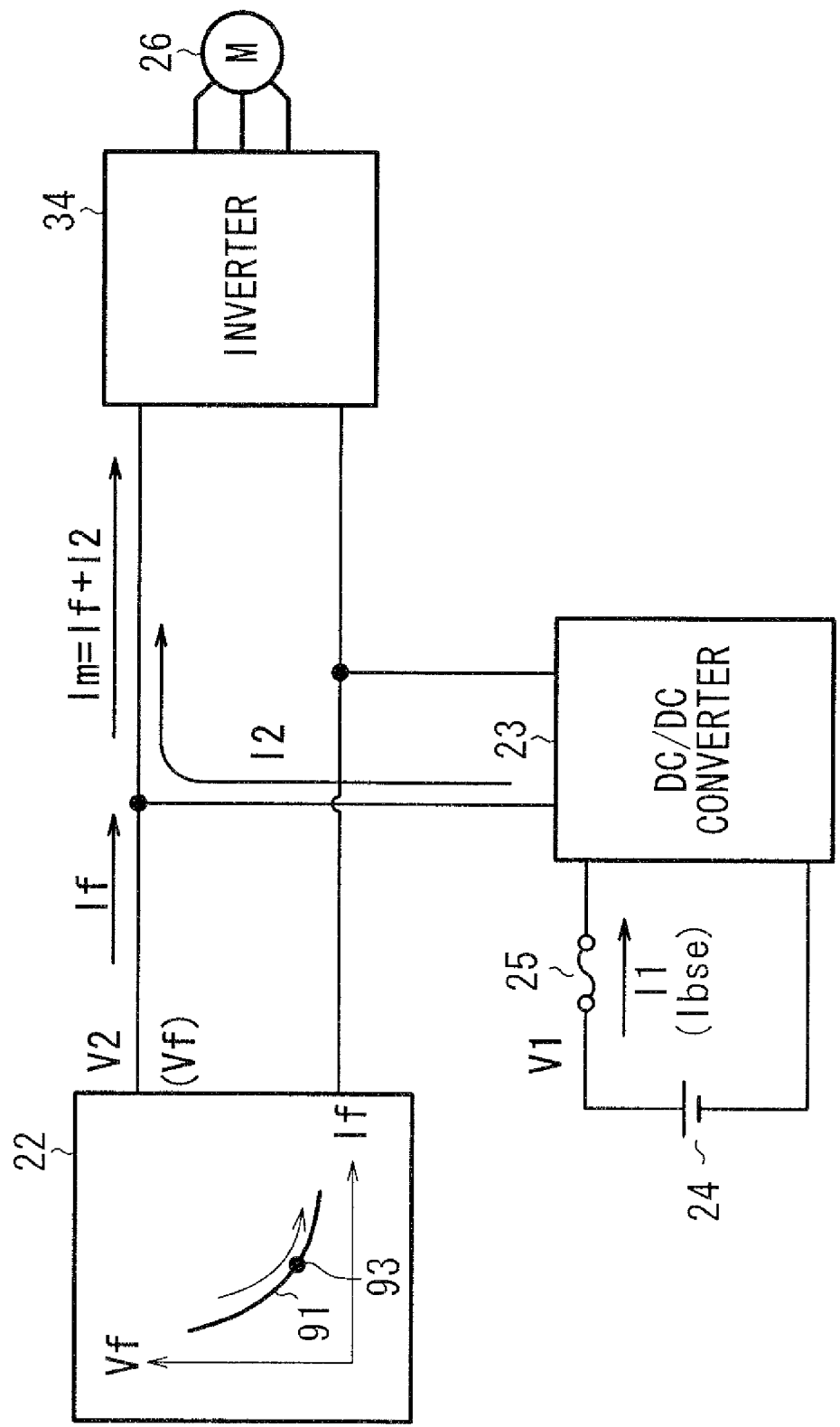
FIG. 7 is a block diagram illustrative of a process of limiting a first source current flowing from a battery.

FIG. 7 is a block diagram illustrative of the directions of currents and a process of controlling the fuel cell 22 of the fuel cell vehicle 20 in the operation mode A. In the operation mode A, the motor current Im is controlled as the sum of the generated current If and the secondary current I2 (Im=If+I2). If the efficiency of the DC/DC converter 36 is 100% for an easier understanding of the invention, then since V1×I1=V2×I2, the motor current Im is expressed as Im=If+I1×(V1/V2).

Figure 8:
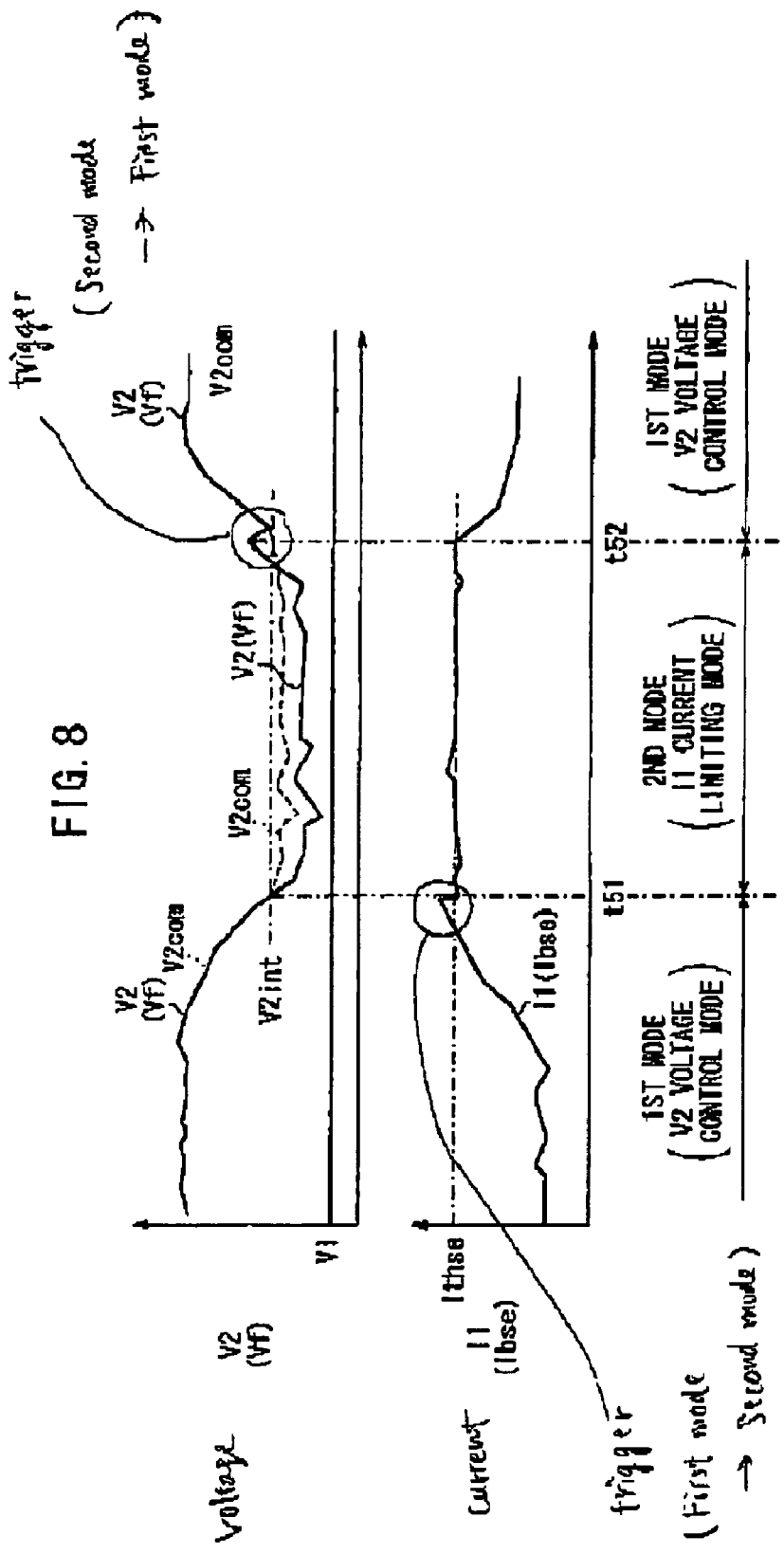
FIG. 8 is a waveform diagram illustrative of the process of limiting a first source current flowing from a battery.

FIG. 8 is a waveform diagram illustrative of the operation mode A.

In a period up to time t51 in FIG. 8, since the first source current Ibse flowing from the battery 24 is of a value lower than the threshold value (current limiting value) Ithse, the converter controller 54 controls the DC/DC converter 36 to bring the generated voltage Vf (the second output voltage V2) of the fuel cell 22 into conformity with the command voltage V2com for the fuel cell 22 which is received from the general controller 56 {a V2 voltage control mode (also referred to as a first mode or an ordinary operation mode)}. In other words, the generated current If is controlled by controlling the generated voltage Vf.

When the value of the first source current Ibse flowing from the battery 24 exceeds the threshold value (current limiting value) Ithse at time t51, the converter controller 54 decides that the fuse 25 may possibly be blown out, interrupts the first mode, i.e., interrupts the control process for bringing the generated voltage Vf of the fuel cell 22 into conformity with the command voltage V2com, and controls the DC/DC converter 36 to keep the value of the first source current Ibse in conformity with the threshold value Ithse {a I1 current limiting mode (also referred to as a second mode or a monitoring operation mode)}.

The secondary voltage V2 at time t51 when the first mode is interrupted is stored as an interruption secondary voltage V2int (see t51 in FIG. 8) in the non-illustrated memory in the converter controller 54.

In a period from time t51 to time t52, the converter controller 54 continues the second mode for bringing the first source current Ibse into conformity with the threshold value Ithse. In other words, the converter controller 54 interrupts, or gives up, the V2 voltage control mode for following the command voltage V2com, and performs the feedback control process based on the PI operation, generally expressed by the equation shown below, which uses the threshold value Ithse as a target current for the first source current Ibse.

(Ithse−Ibse)×Kp+Ki∫(Ithse−Ibse)dt where Kp, Ki represent proportionality coefficients.

According to the feedback control process based on the PI operation, the deviation (Ithse−Ibse) converges to nil even in the presence of disturbances. In other words, the first source current Ibse is exactly equalized to the threshold value Ithse. Therefore, the fuse 25 is not blown out, the battery 24 is not deteriorated, and the reactor 90 is not saturated.

In the period from time t51 to time t52, since the command voltage V2com is not followed, the secondary current I2 is of a fixed value corresponding to the first source current Ibse which is equal to the threshold value Ithse in order to satisfy, as much as possible, the motor current Im=If+I2 that represents a load demand determined from the accelerator opening detected by the accelerator sensor 66. Consequently, an operating point 93 on the fuel cell output characteristic curve 91 shown in the block of the fuel cell 22 in FIG. 7 is moved in the direction of the arrow in order to increase the generated current If.

In other words, the duty ratios for driving the DC/DC converter 36 are controlled to shift the generated voltage Vf (Vf=V2) indicated by the solid-line curve in FIG. 8 downwardly from the command voltage V2com indicated by the dotted-line curve in FIG. 8.

When the load demand decreases, i.e., when the motor current Im is reduced, until the measured value of the second output voltage V2 exceeds the command voltage V2com either by a predetermined voltage or for a predetermined time, the converter controller 54 decides that there is no need to limit the current, cancels the second mode (the I1 current limiting mode or the monitoring operation mode), and reinstates the first mode (the V2 voltage control mode or the ordinary operation mode)}. The converter controller 54 may start to reinstate the first mode when the second output voltage V2 becomes equal to the interruption secondary voltage V2int stored in the memory.

The operation mode A has been described above.

The operation mode B for limiting the first sink current Ibsk flowing into the battery 24 will be described below.

Figure 9:
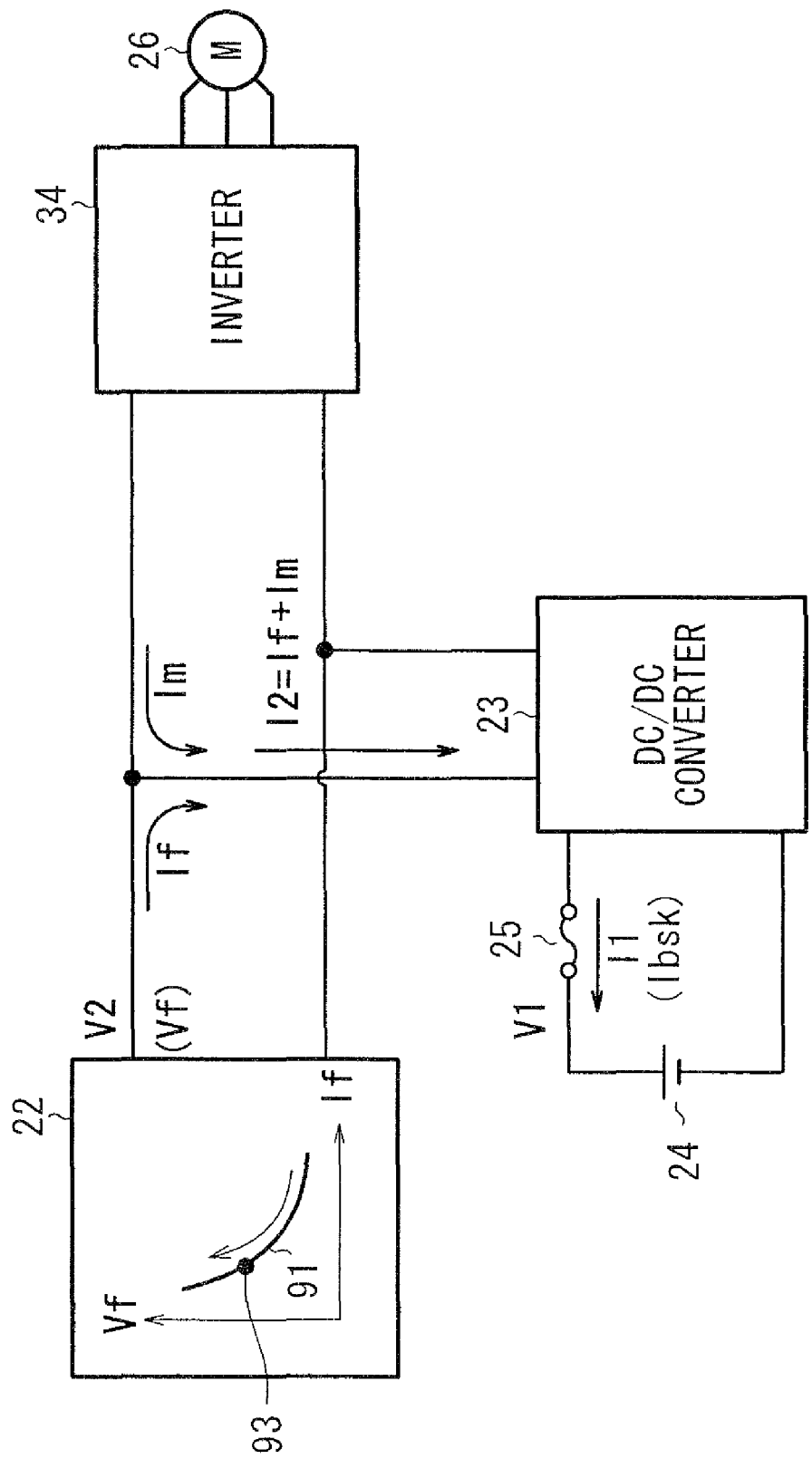
FIG. 9 is a block diagram illustrative of a process of limiting a first sink current flowing into a battery.

FIG. 9 is a block diagram illustrative of the directions of currents and a process of controlling the fuel cell 22 of the fuel cell vehicle 20 in the operation mode B. In the operation mode B, the first sink current Ibsk flowing into the battery 24 is controlled depending on the secondary current I2 which is the sum of the motor current Im as a regenerated current and the generated current If (I2=If+Im). If the efficiency of the DC/DC converter 36 is 100% for the sake of brevity, then since V1×I1=V2×I2, the first sink current Ibsk is expressed as Ibsk=I1=I2×(V2/V1).

Figure 10:
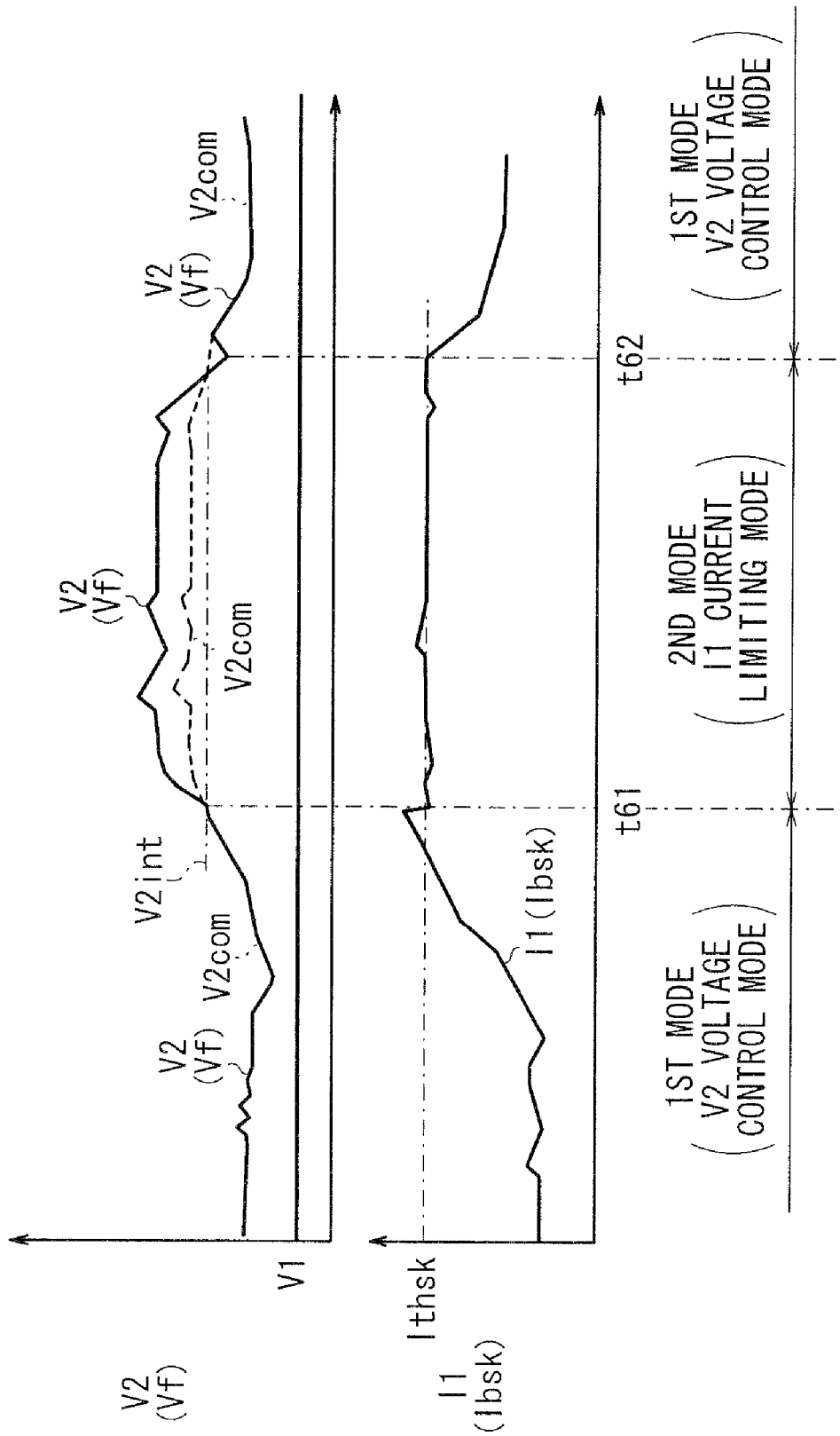
FIG. 10 is a waveform diagram illustrative of the process of limiting a first sink current flowing into a battery.

FIG. 10 is a waveform diagram illustrative of the operation mode B.

In a period up to time t61 in FIG. 10, since the first sink current Ibsk flowing into the battery 24 is of a value lower than the threshold value (current limiting value) Ithsk, the converter controller 54 controls the DC/DC converter 36 in the V2 voltage control mode (the first mode) to bring the generated voltage Vf (the second output voltage V2) of the fuel cell 22 into conformity with the command voltage V2com for the fuel cell 22 which is received from the general controller 56. In other words, the generated current If is controlled by controlling the generated voltage Vf.

When the value of the first sink current Ibsk flowing into the battery 24 exceeds the threshold value (current limiting value) Ithsk at time t61, the converter controller 54 decides that the fuse 25 may possibly be blown out, interrupts the first mode, i.e., interrupts the control process for bringing the generated voltage Vf of the fuel cell 22 into conformity with the command voltage V2com, and controls the DC/DC converter 36 to keep the value of the first sink current Ibsk in conformity with the threshold value Ithsk {a I1 current control mode (also referred to as a third mode or a monitoring operation mode)}.

The secondary voltage V2 at time t61 when the first mode is interrupted is stored as an interruption secondary voltage V2int in the non-illustrated memory in the converter controller 54.

In a period from time t61 to time t62, the converter controller 54 continues the second mode for bringing the first sink current Ibsk into conformity with the threshold value Ithsk. In other words, the converter controller 54 interrupts, or gives up, the V2 voltage control mode for following the command voltage V2com, and performs the feedback control process based on the PI operation, generally expressed by the equa tion shown below, which uses the threshold value Ithsk as a target current for the first sink current Ibsk.

$$(Ithsk-Ibsk) \times Kp + Ki \int (Ithsk-Ibsk) dt$$

where Kp, Ki represent proportionality coefficients.

According to the feedback control process based on the PI operation, the deviation (Ithsk−Ibsk) converges to nil even in the presence of disturbances. In other words, the first source current Ibsk is exactly equalized to the threshold value Ithsk. Therefore, the fuse 25 is not blown out, the battery 24 is not deteriorated, and the reactor 90 is not saturated.

In the period from time t61 to time t62, since the command voltage V2com is not followed, the generated current If is reduced if the motor current Im as a regenerated current is increased. Consequently, an operating point 93 on the fuel cell output characteristic curve 91 shown in the block of the fuel cell 22 in FIG. 9 is moved in the direction of the arrow in order to reduce the generated current If.

In other words, the duty ratios for driving the DC/DC converter 36 are controlled to shift the generated voltage Vf indicated by the solid-line curve in FIG. 10 upwardly from the command voltage V2com indicated by the dotted-line curve in FIG. 10.

When the motor current Im as a regenerated current is reduced until the second output voltage V2 becomes lower than the command voltage V2com either by a predetermined voltage or for a predetermined time, the converter controller 54 decides that there is no need to limit the current, cancels the third mode (the I1 current limiting mode), and reinstates the first mode (the V2 voltage control mode). The converter controller 54 may start to reinstate the first mode when the second output voltage V2 becomes equal to the interruption secondary voltage V2int stored in the memory.

The operation mode B has been described above.

As described above, according to the operation mode A for limiting the first source current Ibse flowing from the battery 24, when the motor current Im demanded by the motor 26 driven by the inverter 34 is controlled as the sum (see FIG. 7) of the secondary current I2 converted from the first source current Ibse by the DC/DC converter 36 and the generated current If, a characteristic and simple control configuration is employed for controlling the generated voltage Vf of the fuel cell 22, i.e., the secondary voltage V2, such that the first source current Ibse will not exceed the threshold value Ithse in the current paths extending from the output point of the battery 24 through the DC/DC converter 36 to the secondary terminals 2S, 2S', i.e., the current path through which the first source current Ibse flows in the present embodiment.

Consequently, the fuse 25 is prevented from being blown out by an overcurrent to protect the battery 24, i.e., to prevent the battery 24 from being deteriorated. When the output terminals of the battery 24 are short-circuited, the fuse 25 is blown out.

More specifically, when the first source current Ibse is of a value lower than the threshold value Ithse, the converter controller 54 controls the secondary voltage V2 to control the generated current If in the first mode. When the first source current Ibse is of a value higher than the threshold value Ithse, the converter controller 54 interrupts the first mode and performs the second mode for reducing the secondary voltage V2 to prevent the first source current Ibse from exceeding the threshold value Ithse, for thereby increasing the generated current If. In this manner, the fuse 25 is prevented from being blown out.

For returning from the second mode to the first mode, the converter controller 54 monitors the secondary voltage V2 while in the second mode.

When the secondary voltage V2 which is being monitored increases up to, for example, the interruption secondary voltage V2int stored at the time the first mode is interrupted, the converter controller 54 returns to the first mode. Alternatively, the converter controller 54 may return to the first mode when the secondary voltage V2 which is being monitored exceeds the command voltage V2com received from the general controller 56.

While in the second mode, if the converter controller 54 performs a feedback control process based on the PI operation or the PID operation, which includes an integrating process, for increasing and reducing the duty ratios for driving the upper arm switching devices 81u, 81v, 81w with the threshold value Ithse being used as a target current for the second source current Ibse, then the second source current Ibse is brought into conformity with the threshold value Ithse, and the generated current If flowing from the fuel cell 22 increases and decreases as the motor current Im increases and decreases. Accordingly, the fuse 25 will not be blown out.

The feedback control process based on the PI operation or the PID operation, which includes an integrating process, keeps the first source current Ibse flowing from the battery 24 accurately in conformity with the threshold value Ithse. The generated current If can thus be of a value smaller than if the first source current Ibse is not held in conformity with the threshold value Ithse, but is a smaller value, and the generated current If flowing from the fuel cell 22 is greater. As a result, the generated voltage Vf of the fuel cell 22 is prevented from being excessively lowered.

While the converter controller 54 is performing the second mode for keeping the first source current Ibse in conformity with the threshold value Ithse, which is an upper limit current value, if the motor current Im that serves as a load sink current demanded by the motor 26 is reduced, then since the first source current Ibse remains in conformity with the threshold value Ithse, the generated current If decreases and the generated voltage Vf increases in quick response to a reduction in the motor current Im.

When the generated voltage Vf, i.e., the secondary voltage V2, increases beyond the command value V2com, the current upper limit limiting control process in the second mode is canceled.

While in the second mode, if the converter controller 54 performs a feedback control process based on the PI operation or the PID operation, which includes an integrating process, for increasing and reducing the duty ratios for driving the lower arm switching devices 82u, 82v, 82w with the threshold value Ithse being used as a target current for the second source current Ibse, then it is possible to prevent the generated voltage Vf of the fuel cell 22 from being excessively lowered and hence to prevent the cancellation of the current upper limit limiting control process from being delayed.

The operation mode B for limiting the first sink current Ibsk flowing into the battery 24 also offers the same advantages as the operation mode A. Specifically, as shown in FIGS. 9 and 10, while the converter controller 54 is performing the third mode for keeping the first sink current Ibsk in conformity with the threshold value Ithsk, which is an upper limit current value, if the motor current Im as a regenerated current is reduced, then since the first sink current Ibsk remains in conformity with the threshold value Ithsk, the generated current If increases and the generated voltage Vf decreases in quick response to a reduction in the motor current Im.

When the generated voltage Vf, i.e., the secondary voltage V2, decreases below the command value V2com, the current upper limit limiting control process in the third mode is canceled.

While in the third mode, if the converter controller 54 performs a feedback control process based on the PI operation or the PID operation, which includes an integrating process, for increasing and reducing the duty ratios for driving the upper arm switching devices 81u, 81v, 81w with the threshold value Ithsk being used as a target current for the second sink current Ibsk, then it is possible to prevent the generated voltage Vf of the fuel cell 22 from being excessively increased and hence to prevent the cancellation of the current upper limit limiting control process from being delayed.

In the fuel cell vehicle 20 shown in FIG. 1, the travel motor 26 which serves as an AC load is driven through the inverter 34. The present invention is also applicable to other apparatus than the fuel cell vehicle 20.

Figure 11:
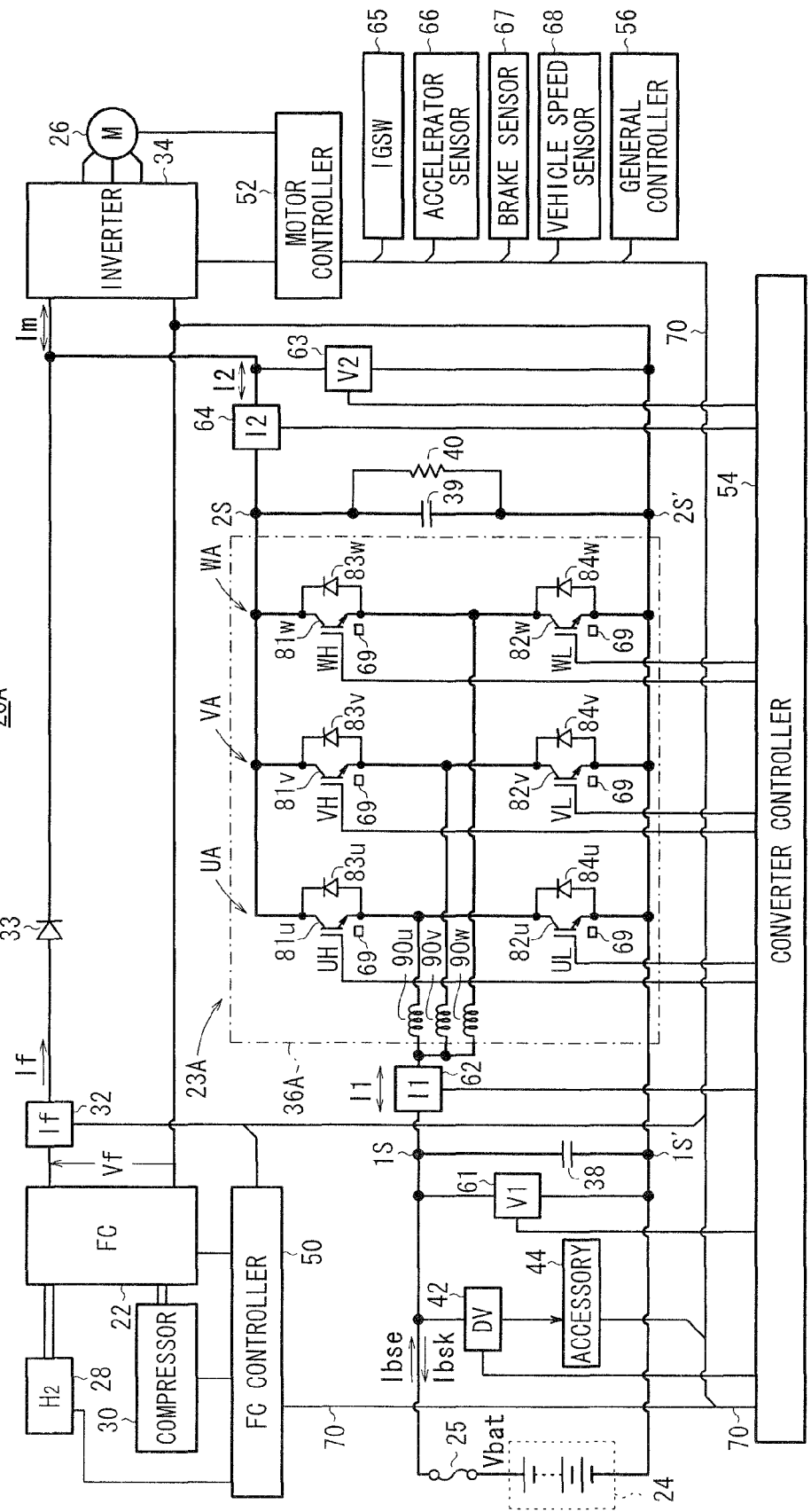
FIG. 11 is a circuit diagram, partly in block form, a fuel cell vehicle incorporating a DC/DC converter apparatus which has three reactors.

As shown in FIG. 11, the principles of the present invention are also applicable to a fuel cell vehicle 20A incorporating a VCU 23A which has a DC/DC converter 36A which includes three reactors 90u, 90v, 90w.

Figure 12:
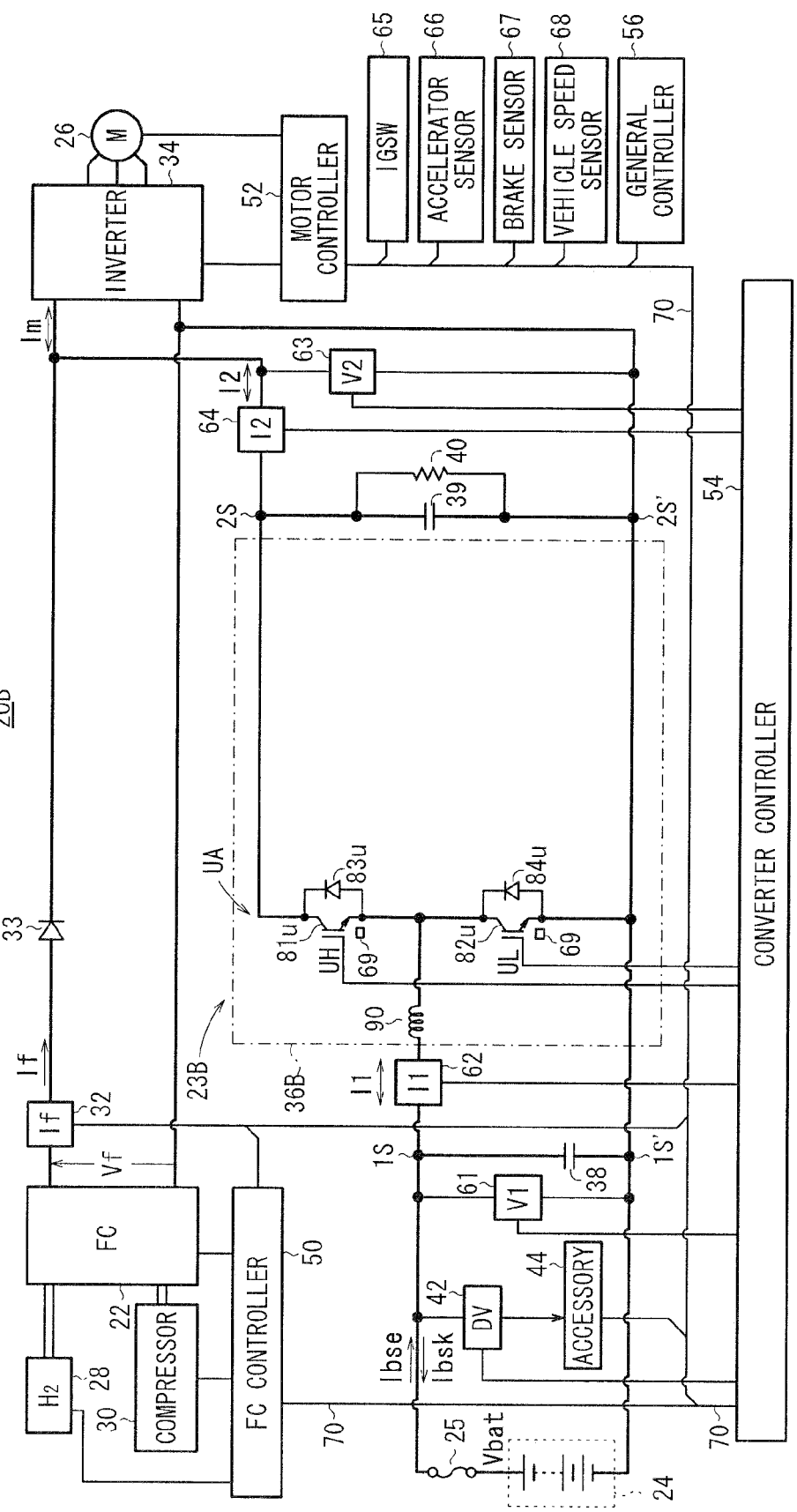
FIG. 12 is a circuit diagram, partly in block form, a fuel cell vehicle incorporating a single-phase DC/DC converter apparatus.

As shown in FIG. 12, the principles of the present invention are also applicable to a fuel cell vehicle 20B incorporating a VCU 23B which has a single-phase DC/DC converter 36B.

Although certain preferred embodiments of the present invention have been shown and described in detail, it should be understood that various changes and modifications may be made therein without departing from the scope of the appended claims.

What is claimed is:

1. A method of controlling a hybrid DC power supply system including a first DC power supply device for generating a first output voltage and delivering a first source current (Ibse) flowing from the first DC power supply device or receiving a first sink current (Insk) flowing into the first DC power supply device; a second DC power supply device connected to a load, for delivering a second source current which increases as a second output voltage generated thereby decreases and which decreases as the second output voltage increases; and a voltage increasing/reducing DC/DC converter connected between the first DC power supply device and a junction between the load and the second DC power supply device, for controlling the second output voltage by increasing or reducing duty ratios for driving switching devices thereof, the method of controlling the hybrid DC power supply system including a first operation mode that limits the first source current and a second operation mode that limits the first sink current, the first operation mode comprising the steps of:

controlling the hybrid DC power supply system such that a load sink current demanded by the load is the sum of a current converted from the first source current by the DC/DC converter and the second source current; and controlling the second output voltage of the second DC power supply device such that a value of a current flowing from an output point of the first DC power supply device through the DC/DC converter to the junction is less than or equal to a predetermined threshold value such that:

when the value of the current flowing through the DC/DC converter is smaller than the threshold value, performing a first mode for controlling the second source current by controlling the second output voltage, and when the value of the current flowing through the DC/DC converter is greater than the threshold value, interrupting the first mode and performing a second mode for reducing the second output voltage and increasing the second source current such that the value of the current flowing through the DC/DC converter is less than or equal to the threshold value.

2. A method according to claim 1, further comprising the step of returning from the second mode to the first mode by monitoring the second output voltage of the second DC power supply device.

3. A method according to claim 2, further comprising the steps of monitoring the second output voltage, and returning from the second mode to the first mode when the second output voltage increases up to a voltage at which the first mode was interrupted.

4. A method according to claim 2, wherein the hybrid DC power supply system further includes a higher-level controller for supplying a command voltage, further comprising the steps of performing a process for controlling the second output voltage so as to be in conformity with the command voltage in the first mode, interrupting the process for controlling the second output voltage when in the second mode, and returning the second mode to the first mode when the second output voltage, which is being monitored, exceeds the command voltage.

5. A method according to claim 1, further comprising the step of performing a feedback control process including an integrating process for increasing or reducing the duty ratios with the threshold value being used as a target current for the value of the current flowing through the DC/DC converter in the second mode.

6. A method according to claim 1, wherein the first DC power supply device comprises an electricity storage device, and the second DC power supply device comprises a fuel cell.

7. A method according to claim 1, wherein the load of the hybrid DC power supply system comprises a motor driven by an inverter.

8. A method of controlling a hybrid DC power supply system including a first DC power supply device for generating a first output voltage and delivering a first source current (Ibse) flowing from the first DC power supply device or receiving a first sink current (Insk) flowing into the first DC power supply device; a second DC power supply device connected to a load, for delivering a second source current which increases as a second output voltage generated thereby decreases and which decreases as the second output voltage increases; and a voltage increasing/reducing DC/DC converter connected between the first DC power supply device and a junction between the load and the second DC power supply device, for controlling the second output voltage by increasing or reducing duty ratios for driving switching devices thereof, the method of controlling the hybrid DC power supply system including a first operation mode that limits the first source current and a second operation mode that limits the first sink current, the second operation mode comprising the steps of:

controlling the hybrid DC power supply system such that the first sink current flows from the DC/DC converter into the first DC power supply device; and controlling the second output voltage of the second DC power supply device such that a value of a current flowing from the junction through the DC/DC converter to an input point of the first DC power supply device is less than or equal to a predetermined threshold value, such that:

when the value of the current flowing through the DC/DC converter is smaller than the threshold value, performing a first mode for controlling the second source current by controlling the second output voltage, and when the value of the current flowing through the DC/DC converter is greater than the threshold value, interrupting the first mode and performing a second mode for increasing the output voltage and reducing the second source current such that the value of the current flowing through the DC/DC converter is less than or equal to the threshold value.

9. A method according to claim 8, further comprising the step of returning from the second mode to the first mode by monitoring the second output voltage of the second DC power supply device.

10. A method according to claim 8, further comprising the steps of monitoring the second output voltage, and returning the second mode to the first mode when the second output voltage decreases to a value at which the first mode is interrupted.

11. A method according to claim 8, wherein the hybrid DC power supply system further includes a higher-level controller for supplying a command voltage, further comprising the steps of performing a process for controlling the second output voltage so as to be in conformity with the command voltage in the first mode, interrupting the process for controlling the second output voltage when in the second mode, and returning the second mode to the first mode when the second output voltage, which is being monitored, becomes lower than the command voltage.

12. A method according to claim 8, further comprising the step of performing a feedback control process including an integrating process for increasing or reducing the duty ratios with the threshold value being used as a target current for the value of the current flowing through the DC/DC converter in the second mode.

* * * * *